No. 655,470. Patented Aug. 7, 1900.
W. H. WASHBURN.
CONCENTRATOR.
(Application filed July 1, 1899.)
(No Model.)
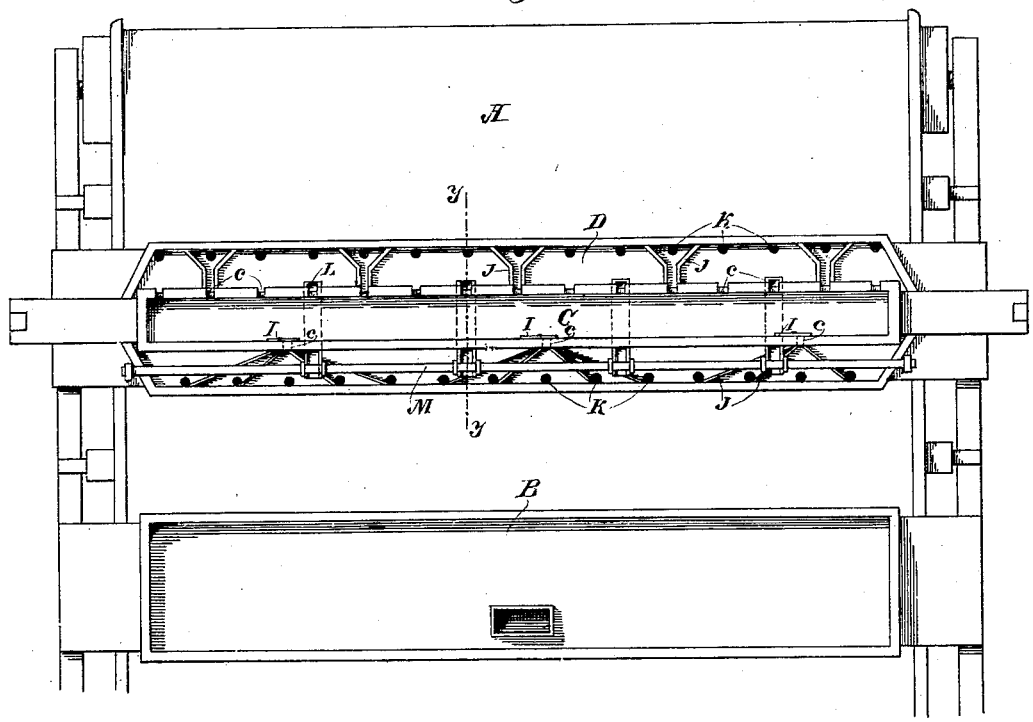
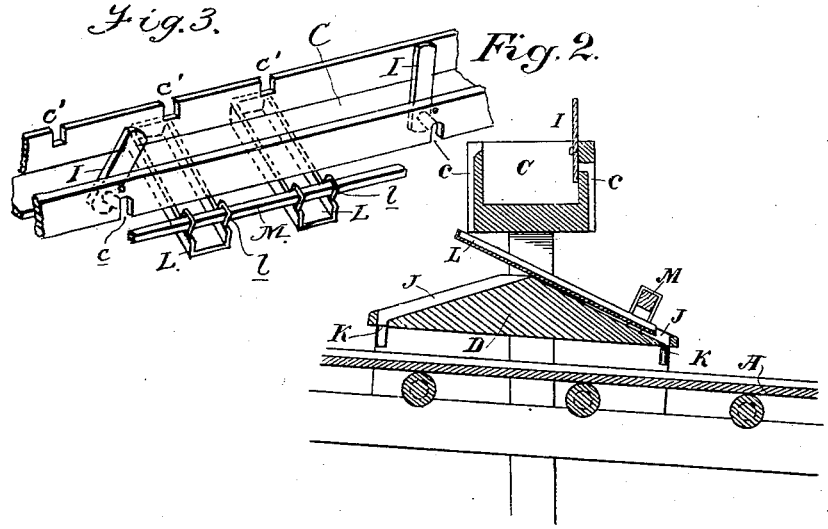
Witnesses,
Inventor
William H. Washburn
By Dewey Strong & Co.
attys

UNITED STATES PATENT OFFICE.

WILLIAM H. WASHBURN, OF OROVILLE, WASHINGTON, ASSIGNOR OF ONE-HALF TO JULIA B. WASHBURN, OF BAKER CITY, OREGON.

CONCENTRATOR.

SPECIFICATION forming part of Letters Patent No. 655,470, dated August 7, 1900.

Application filed July 1, 1899. Serial No. 722,572. (No model.)

*To all whom it may concern:*

Be it known that I, WILLIAM H. WASHBURN, a citizen of the United States, residing at Oroville, county of Okanogan, State of Washington, have invented an Improvement in Concentrators; and I hereby declare the following to be a full, clear, and exact description of the same.

My invention relates to improvements in concentrators, more especially that class of the endless traveling and shaking belt type; and it consists of the parts and the constructions and combinations of parts hereinafter described and claimed.

Referring to the accompanying drawings, Figure 1 is a plan view of the front end of concentrator. Fig. 2 is a lateral section on line *y y* of Fig. 1. Fig. 3 is a detail showing in perspective a portion of the water-box with its openings *c* and two troughs L and their supporting rod or bar M.

A is an endless traveling belt mounted in any usual or suitable manner upon a frame which is in itself capable of oscillation, whereby a shaking motion is given to it in addition to its traveling motion. Above this belt is fixed the pulp-distributing device or tank B, having suitable openings through which the pulp is delivered upon the belt.

C is a clear-water box which is stationary, and D is a clear-water distributer or spreader which extends across the belt and is so supported as to be shaken in unison with it. This distributer or spreader is herein shown as having oppositely-inclined surfaces, which facilitate the subdivision and distribution of the water from the box C.

In place of the small openings through which the water is usually discharged from the box and which are liable to be clogged, and in any event are difficult to regulate, I arrange a small number of large openings *c* in the box C, and these openings may be regulated and adjusted by means of swinging gates I.

On the rear side of the clear-water box C are a number of overflow-passages *c'*, and the flow from these passages either drops down upon the rearward incline of the distributer D or by the movement of troughs L, hereinafter mentioned, it may be directed partially or wholly into these troughs, and thus to the front of the distributer. This is done by moving the troughs L along the supporting-bar M, so that they may be exposed more or less to receive the water overflowing from the box C. The bands *l*, which are attached to the troughs, embrace the bar M and hold the troughs in their proper position to allow them to be slid along the front of the box to receive more or less of the overflow.

Partitions J are attached to the spreader or distributer D in such a manner as to divert the water in approximately-equal portions to several holes K, so that each of the discharge-openings from the water-box C feeds a certain number of these holes. Thus they are all supplied for the full width of the belt. It will be observed that the partitions are so separated at the point where the water from the box falls upon them that as they oscillate backward and forward beneath the water in unison with the shake of the table an equal amount of water is cut out by the several channels between the partitions and by them is led to the discharge-holes in the edge of the distributer. The holes may be equal in number or greater than the number of channels, as may be desired, so that one channel may serve one or two or more holes. By such a device it is practicable to so subdivide the water that it may fall upon the belt in a succession of drops, if desired, without the adjacent passages becoming choked. Such a fine adjustment on the rear of the water at the rear edge of the distributer is found in practice to increase the percentage of concentrates saved on machines which have previously been considered to do very close work. The same result can be produced by means of a number of narrow troughs L about one inch wide and long enough to extend from the rear side of the distributing board or spreader to and a little beyond the front side of the stationary box. There may be as many of these troughs as there are water-passages in the front side of the box, and they are attached to a one or two inch wooden rod M the same distance apart between the centers as the water-passages. These are so arranged that they can be moved lengthwise of the distributing-board, and thus cut out any portion of the streams falling through the passages on the front side. The amount of water falling during any fraction of the stroke is thus diverted to the rear of the distributer, the balance flowing through the front holes thereof. In this construction the apparatus is easily visible from the front side. The operation is, however, essentially the same.

Having thus described my invention, what I claim as new, and desire to secure by Letters Patent, is—

1. The combination in a concentrator of a water-distributing box, a transversely-movable distributer or spreader having oppositely-inclined surfaces and channels or partitions adapted to move beneath the falling streams of water whereby the latter are subdivided and delivered in small amounts upon the concentrator.

2. In a shaking-concentrator, a water-supply box, a distributer or spreader having oppositely-inclined surfaces and a series of divergent partitions or channels adapted to move transversely beneath the box, whereby the streams of water delivered therefrom are subdivided and successively fall into the various channels.

3. The combination with a concentrating belt or surface of a water-supply and a distributer or spreader composed of oppositely-inclined surfaces and a series of divergent channels thereon adapted to reciprocate beneath the falling streams of water.

4. In a concentrator, the combination of a source of water-supply, a spreader comprising oppositely-inclined surfaces with a series of divergent channels, and means for reciprocating said channels beneath the falling stream of water whereby it is subdivided into a number of small streams.

5. In a concentrator, a water-supply device having discharge-openings, a distributer or spreader having oppositely-inclined surfaces adapted to reciprocate beneath said openings, and having a series of divergent channels alternately supplied from the water-box, said distributer also having a series of discharge-openings at its opposite edges, and gates by which the amount of water delivered to the channels is regulated.

6. In a concentrator, the combination of a source of water-supply, a spreader or distributer comprising a series of channels, means for reciprocating said channels beneath the falling stream of water whereby it is subdivided into a number of smaller streams, and an adjustable support to which said channels are attached whereby they may be adjusted to cut out of the falling stream a greater or less amount of water as may be desired.

In witness whereof I have hereunto set my hand.

WILLIAM H. WASHBURN.

Witnesses:
C. E. BLACKWELL,
J. F. SAMPSON.